US012722694B2

(12) United States Patent
Lee

(10) Patent No.: US 12,722,694 B2
(45) Date of Patent: Sep. 1, 2026

(54) APPARATUS FOR CONTROLLING ELECTRIC STEERING SYSTEM AND METHOD THEREFOR

(71) Applicant: HYUNDAI MOBIS CO., LTD., Seoul (KR)

(72) Inventor: Tae Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 6 days.

(21) Appl. No.: 18/925,264

(22) Filed: Oct. 24, 2024

(65) Prior Publication Data

US 2025/0269898 A1 Aug. 28, 2025

(30) Foreign Application Priority Data

Feb. 26, 2024 (KR) ........................ 10-2024-0027562

(51) Int. Cl.
*B62D 6/00* (2006.01)
*B60R 25/02* (2013.01)
*B60R 25/24* (2013.01)

(52) U.S. Cl.
CPC ................ *B62D 6/00* (2013.01); *B60R 25/02* (2013.01); *B60R 25/24* (2013.01)

(58) Field of Classification Search
CPC ............ B62D 6/00; B60R 25/02; B60R 25/24
See application file for complete search history.

(56) References Cited

U.S. PATENT DOCUMENTS 9,630,628 B2 * 4/2017 Holub ................... B60W 50/08
12,001,202 B2 * 6/2024 Oyama ................. H04W 4/024
2015/0203147 A1 * 7/2015 Kuramochi .......... B62D 5/0496 701/41
2015/0353033 A1 * 12/2015 Pribisic ................ H03K 17/962 307/115
2017/0158168 A1 * 6/2017 Nantz ..................... B60R 25/24
2017/0158169 A1 * 6/2017 Luo .......................... G07C 9/21
2017/0352215 A1 * 12/2017 Maiwand ........... G07C 9/00309
2023/0012253 A1 * 1/2023 Lee ........................ B62D 5/006
2024/0011336 A1 * 1/2024 Gudapati ................ E05B 81/56

FOREIGN PATENT DOCUMENTS

DE 69935484 T2 * 11/2007 ............. B62D 5/065
JP 2005029001 A * 2/2005
JP 2008110729 A * 5/2008
KR 10-2007-0072704 A 7/2007

OTHER PUBLICATIONS

Machine Translation of JP 2008110729 A PDF File Name: "JP2008110729A_Machine_Translation.pdf" (Year: 2008).*
Machine Translation of JP 2005029001 A PDF File Name: "JP2005029001A_Machine_Translation.pdf" (Year: 2005).*
Machine Translation of DE 69935484 T2 PDF File Name: "DE69935484T2_Machine_Translation.pdf" (Year: 2007).*

* cited by examiner

*Primary Examiner* — Grant Moubry
*Assistant Examiner* — Ruben Picon-Feliciano
(74) *Attorney, Agent, or Firm* — Morgan, Lewis & Bockius LLP

(57) ABSTRACT

An apparatus for controlling an electric steering system includes: a communication transceiver IC detecting an external operation signal while an ignition of a vehicle is off and outputting a wake-up signal through an internal communication network of the vehicle; and a processor, activated by the wake-up signal, controlling the electric steering system to automatically perform steering aging before a user enters the vehicle.

13 Claims, 5 Drawing Sheets

FIG.1

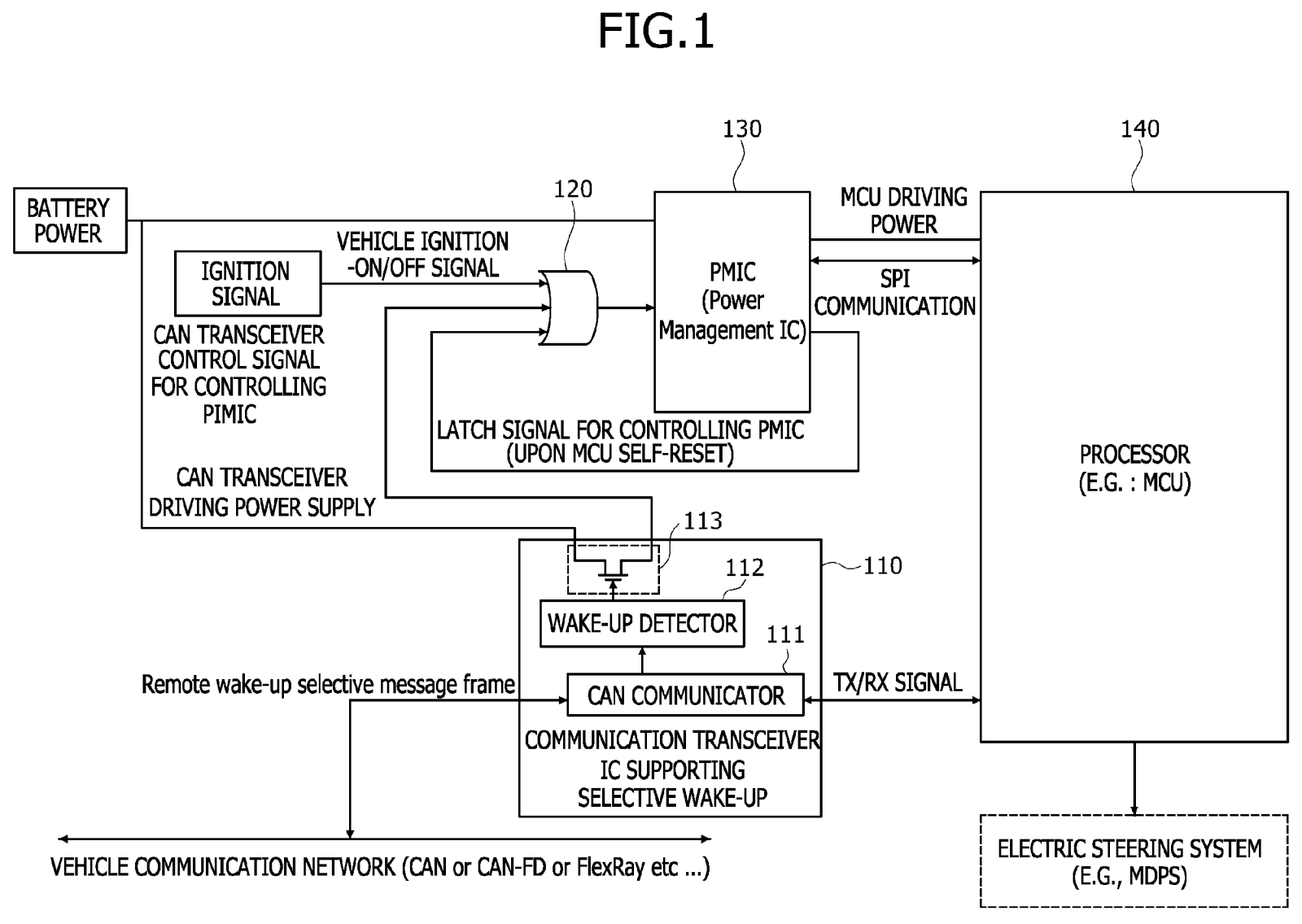

140
PROCESSOR
(E.G. : MCU)
ELECTRIC STEERING SYSTEM
(E.G., MDPS)
MCU DRIVING POWER
SPI COMMUNICATION
TX/RX SIGNAL
130
PMIC
(Power Management IC)
110
111
112
113
WAKE-UP DETECTOR
CAN COMMUNICATOR
COMMUNICATION TRANSCEIVER IC SUPPORTING SELECTIVE WAKE-UP
120
LATCH SIGNAL FOR CONTROLLING PMIC
(UPON MCU SELF-RESET)
VEHICLE IGNITION -ON/OFF SIGNAL
IGNITION SIGNAL
CAN TRANSCEIVER CONTROL SIGNAL FOR CONTROLLING PIMIC
CAN TRANSCEIVER DRIVING POWER SUPPLY
Remote wake-up selective message frame
BATTERY POWER
VEHICLE COMMUNICATION NETWORK (CAN or CAN-FD or FlexRay etc ...)

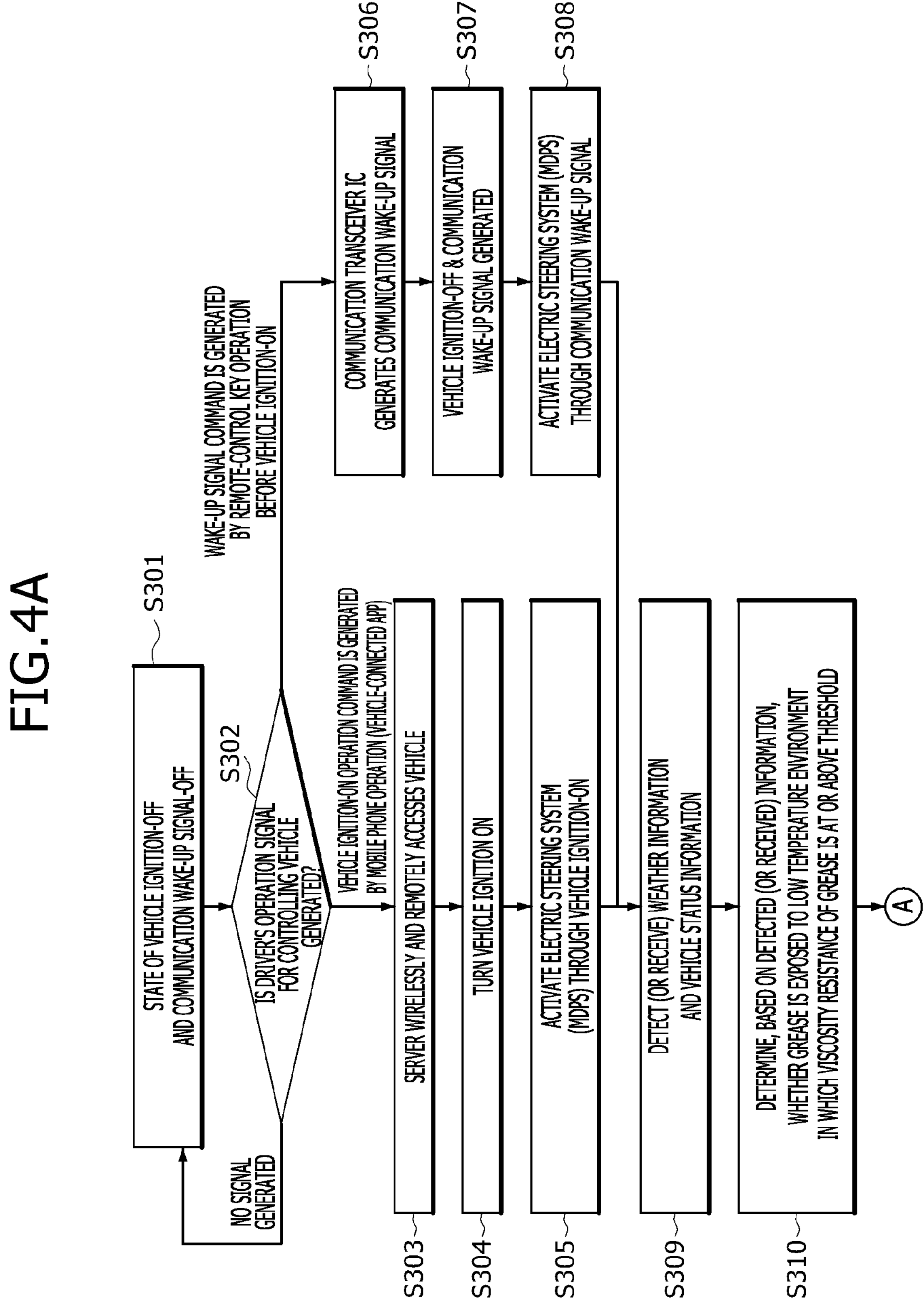
FIG.4A
S301
STATE OF VEHICLE IGNITION-OFF
AND COMMUNICATION WAKE-UP SIGNAL-OFF
S302
IS DRIVER'S OPERATION SIGNAL
FOR CONTROLLING VEHICLE
GENERATED?
NO SIGNAL
GENERATED
WAKE-UP SIGNAL COMMAND IS GENERATED
BY REMOTE-CONTROL KEY OPERATION
BEFORE VEHICLE IGNITION-ON
VEHICLE IGNITION-ON OPERATION COMMAND IS GENERATED
BY MOBILE PHONE OPERATION (VEHICLE-CONNECTED APP)
S306
COMMUNICATION TRANSCEIVER IC
GENERATES COMMUNICATION WAKE-UP SIGNAL
S307
VEHICLE IGNITION-OFF & COMMUNICATION
WAKE-UP SIGNAL GENERATED
S308
ACTIVATE ELECTRIC STEERING SYSTEM (MDPS)
THROUGH COMMUNICATION WAKE-UP SIGNAL
S303
SERVER WIRELESSLY AND REMOTELY ACCESSES VEHICLE
S304
TURN VEHICLE IGNITION ON
S305
ACTIVATE ELECTRIC STEERING SYSTEM
(MDPS) THROUGH VEHICLE IGNITION-ON
S309
DETECT (OR RECEIVE) WEATHER INFORMATION
AND VEHICLE STATUS INFORMATION
S310
DETERMINE, BASED ON DETECTED (OR RECEIVED) INFORMATION,
WHETHER GREASE IS EXPOSED TO LOW TEMPERATURE ENVIRONMENT
IN WHICH VISCOSITY RESISTANCE OF GREASE IS AT OR ABOVE THRESHOLD
A

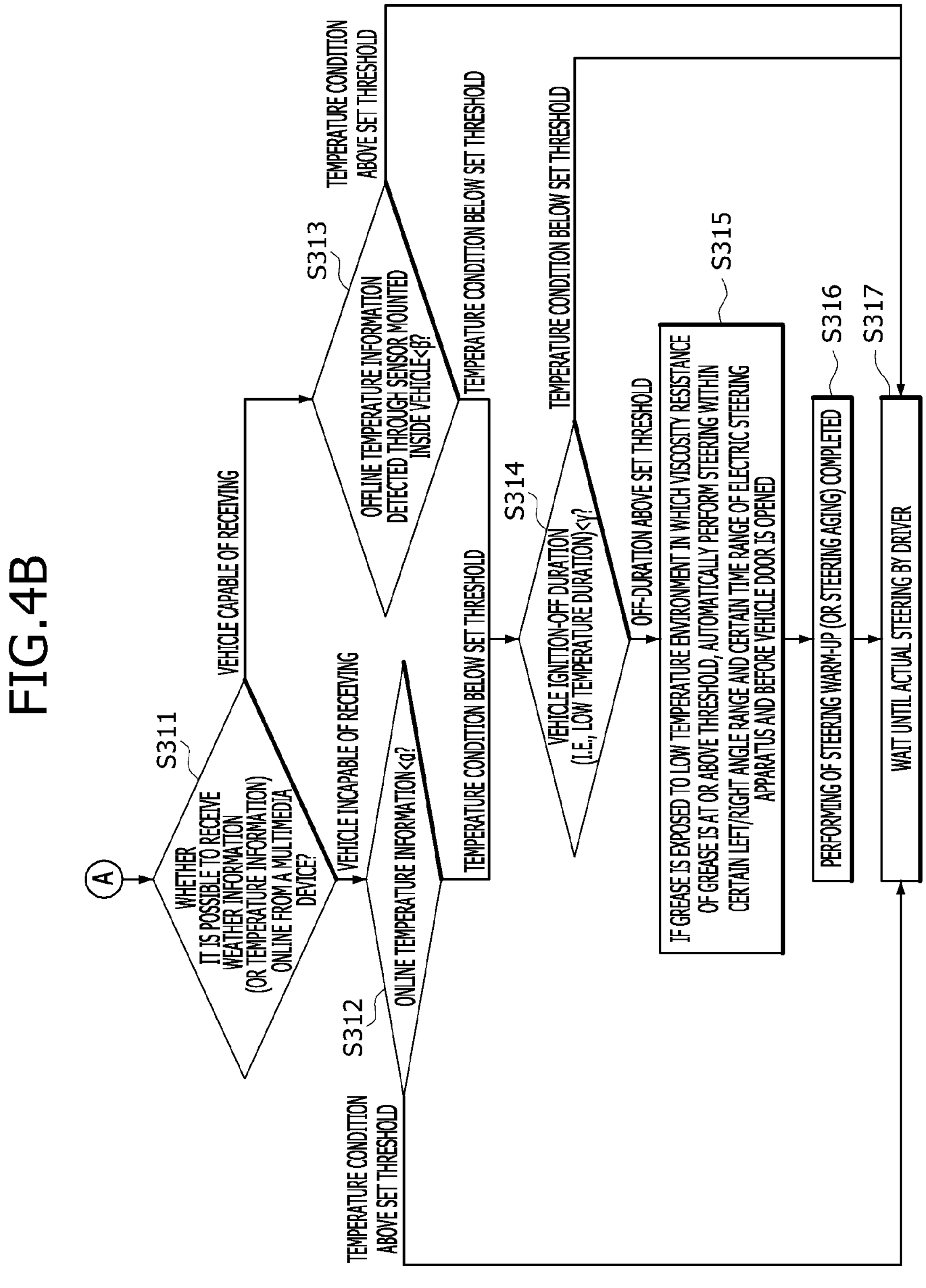
FIG.4B
A
S311
WHETHER IT IS POSSIBLE TO RECEIVE WEATHER INFORMATION (OR TEMPERATURE INFORMATION) ONLINE FROM A MULTIMEDIA DEVICE?
VEHICLE CAPABLE OF RECEIVING
VEHICLE INCAPABLE OF RECEIVING
S312
ONLINE TEMPERATURE INFORMATION<α?
TEMPERATURE CONDITION ABOVE SET THRESHOLD
TEMPERATURE CONDITION BELOW SET THRESHOLD
S313
OFFLINE TEMPERATURE INFORMATION DETECTED THROUGH SENSOR MOUNTED INSIDE VEHICLE<β?
TEMPERATURE CONDITION ABOVE SET THRESHOLD
TEMPERATURE CONDITION BELOW SET THRESHOLD
S314
VEHICLE IGNITION-OFF DURATION (I.E., LOW TEMPERATURE DURATION)<γ?
TEMPERATURE CONDITION BELOW SET THRESHOLD
OFF-DURATION ABOVE SET THRESHOLD
S315
IF GREASE IS EXPOSED TO LOW TEMPERATURE ENVIRONMENT IN WHICH VISCOSITY RESISTANCE OF GREASE IS AT OR ABOVE THRESHOLD, AUTOMATICALLY PERFORM STEERING WITHIN CERTAIN LEFT/RIGHT ANGLE RANGE AND CERTAIN TIME RANGE OF ELECTRIC STEERING APPARATUS AND BEFORE VEHICLE DOOR IS OPENED
S316
PERFORMING OF STEERING WARM-UP (OR STEERING AGING) COMPLETED
S317
WAIT UNTIL ACTUAL STEERING BY DRIVER

APPARATUS FOR CONTROLLING ELECTRIC STEERING SYSTEM AND METHOD THEREFOR

CROSS-REFERENCE TO RELATED APPLICATION

This application claims priority from and the benefit of Korean Patent Application No. 10-2024-0027562, filed on Feb. 26, 2024, which is hereby incorporated by reference for all purposes as if set forth herein.

BACKGROUND

Field

Exemplary embodiments of the present disclosure relate to an apparatus for controlling an electric steering system and a method therefor, which enables warming up (or aging) of the electric steering system before a user enters a vehicle.

Discussion of the Background

In general, an electric steering system (e.g., MDPS) is composed of various mechanical components.

For example, the electric steering system is equipped with various gears (e.g., a worm wheel and worm shaft of a reducer, and the like) that convert torque of an electric drive motor into rotational energy of a wheel in response to a driver's steering wheel operation (e.g., a magnitude of torque, a direction of rotation, and the like), and grease (lubricant) is applied to the electric steering system in order to reduce friction between the gears and ensure smooth operation.

For the grease (lubricant) applied for the reduced friction and smooth operation of the mechanical components in the electric steering system (e.g., MDPS), viscosity resistance of grease may increase when a vehicle is stored for a long time in a low-temperature environment such as a cold winter. Thus, when a driver operates the steering wheel after entering and starting the vehicle, a stiffer steering feel may be produced compared to a normal ambient temperature state, and in severe cases, the stiffened grease may cause noise or unwanted sound from the mechanical components.

As descried above, as viscosity resistance of grease applied to the mechanical components of the electric steering system increases in a low temperature environment, the stiffer steering feel, noise, and unwanted sound in the mechanical components may occur when the vehicle is started, thereby degrading the perceived quality of the electric power steering system and causing discomfort to the driver, potentially leading to a field claim from the driver.

Accordingly, there is a need for a method to reduce the viscosity resistance of grease causing the stiff steering feel, noise, and unwanted sound by recognizing a low temperature environment and automatically warming up (or aging) the electric steering system in a stationary state before a user enters the vehicle or before the user starts the vehicle.

The related art of the present disclosure is disclosed in Korean Patent Publication No. 10-2007-0072704 (published on Jul. 5, 2007).

SUMMARY

An objective of the present disclosure according to an aspect of the present disclosure is to provide an apparatus for controlling an electric steering system and a method therefor, which may enable warming-up (or aging) of the electric steering system before a user enters a vehicle.

Another objective of the present disclosure according to another aspect of the present disclosure is to provide an apparatus for controlling an electric steering system and a method therefor, which may reduce viscosity resistance of grease causing a stiff steering feel, noise, and unwanted sound by recognizing a low temperature environment and automatically warming up (or aging) the electric steering system in a stationary state before a user enters the vehicle or before the user starts the vehicle.

In an embodiment, an apparatus for controlling an electric steering system includes: a communication transceiver IC detecting an external operation signal while an ignition of a vehicle is off and outputting a wake-up signal through an internal communication network of the vehicle; and a processor, activated by the wake-up signal, controlling the electric steering system to automatically perform steering aging before a user enters the vehicle.

In the present disclosure, the communication transceiver IC supports a vehicle wake-up in a vehicle-connected manner through a mobile terminal of the user.

In the present disclosure, the communication transceiver IC outputs a communication wake-up signal to activate the processor when the user operates a remote-control key vehicle before the ignition of the vehicle is on, and the activated processor controls the electric steering system to automatically perform steering aging before the user enters the vehicle.

In the present disclosure, the apparatus for controlling an electric steering system further includes a power management IC converting battery power into driving power of the processor and applying the resulting driving power to activate the processor by the wake-up signal.

In the present disclosure, when the user transmits a vehicle ignition-on command to a server via a user terminal with a vehicle-connected application installed therein, the communication transceiver IC receives the vehicle ignition-on command, sent by the server through wireless remote access to the vehicle, to activate the processor, and the processor processes the vehicle ignition-on command to remotely turn the vehicle ignition on and activates the electric steering system to automatically perform steering aging.

In the present disclosure, the processor, after being activated, detects weather information or temperature information, temperature inside the vehicle, and information on vehicle ignition-off duration from a sensor or a server included inside the vehicle and the processor automatically performs the steering aging of the electric steering system, when it is determined, based on the weather information or the temperature information, the temperature inside the vehicle, and the information on vehicle ignition-off duration, that grease is exposed to a low temperature environment in which viscosity resistance of grease is at or above preset threshold viscosity resistance.

In the present disclosure, the processor performs the steering aging of the electric steering system based on a lookup table, which shows a relationship, pre-calculated through an experiment, between the detected information and viscosity resistance of grease.

In the present disclosure, when the grease is exposed to a low temperature environment in which viscosity resistance of grease is at or above a preset threshold, the processor automatically performs steering aging within a certain left/ right angle range and a certain time range of the electric steering system before the vehicle door is opened by the user.

In the present disclosure, if the temperature information is lower than a predetermined threshold temperature and if the vehicle ignition-off duration is not less than a predetermined threshold time, the processor determines that the grease is exposed to a low temperature environment in which viscosity resistance of grease is at or above a preset threshold and automatically performs steering aging in a predetermined manner.

In another embodiment, a method for controlling an electric steering system includes: outputting, by a communication transceiver IC, a wake-up signal through an internal communication network of the vehicle by detecting an external operation signal while an ignition of a vehicle is off; and controlling, by a processor activated by the wake-up signal, the electric steering system to automatically perform steering aging before a user enters the vehicle.

In the present disclosure, in the outputting of the wake-up signal through the internal communication network of the vehicle, the communication transceiver IC outputs a communication wake-up signal to activate the processor when the user operates a remote-control key before the ignition of the vehicle is on, and the activated processor controls the electric steering system to automatically perform steering aging before the user enters the vehicle.

In the present disclosure, a power management IC, activated by the wake-up signal, converts battery power into driving power of the processor and applies the resulting driving power to activate the processor by the wake-up signal.

In the present disclosure, in the detecting, by the communication transceiver IC, of the external operation signal, the communication transceiver IC receives the vehicle ignition-on command, sent by the server through wireless remote access to the vehicle, to activate the processor, when the user transmits a vehicle ignition-on command to a server via a user terminal with a vehicle-connected application installed therein, and the processor processes the vehicle ignition-on command to remotely turn the vehicle ignition on and activates the electric steering system to automatically perform steering aging.

In the present disclosure, in the controlling of the electric steering system to automatically perform steering aging, the processor, after being activated, detects weather information or temperature information, temperature inside the vehicle, and information on vehicle ignition-off duration from a sensor or a server included inside the vehicle and the processor automatically performs the steering aging of the electric steering system, when it is determined, based on the weather information or the temperature information, the temperature inside the vehicle, and the information on vehicle ignition-off duration, that grease is exposed to a low temperature environment in which viscosity resistance of grease is at or above preset threshold viscosity resistance.

In the present disclosure, in the controlling of the electric steering system to automatically perform steering aging, the processor performs the steering aging of the electric steering system based on a lookup table, which shows a relationship, pre-calculated through an experiment, between the detected information and viscosity resistance of grease.

In the present disclosure, when the grease is exposed to a low temperature environment in which viscosity resistance of grease is at or above a preset threshold the processor automatically performs steering aging within a certain left/right angle range and a certain time range of the electric steering system, and before the vehicle door is opened by the user.

In the present disclosure, if the temperature information is lower than a designated threshold temperature and if the vehicle-off duration is not less than a designated threshold time, the processor determines that the grease is exposed to a low temperature environment in which viscosity resistance of grease is at or above a preset threshold, and automatically performs steering aging in a predetermined manner.

The present disclosure according to another aspect may reduce, in advance, viscosity resistance of grease by recognizing a low temperature environment and automatically warming up (or aging) the electric steering system in a stationary state before a user enters the vehicle or before the user enters and starts the vehicle, thereby preventing degradation of the perceived quality caused by a stiff steering feel, noise, and unwanted sound.

BRIEF DESCRIPTION OF THE DRAWINGS

FIG. 1 is an exemplary view showing a schematic configuration of an apparatus for controlling an electric steering system according to an embodiment of the present disclosure.

FIGS. 4*a* and 4*b* are flowcharts illustrating the method for controlling an electric steering system before a user enters a vehicle according to an embodiment of the present disclosure.

DETAILED DESCRIPTION OF THE ILLUSTRATED EMBODIMENTS

Figure 2:
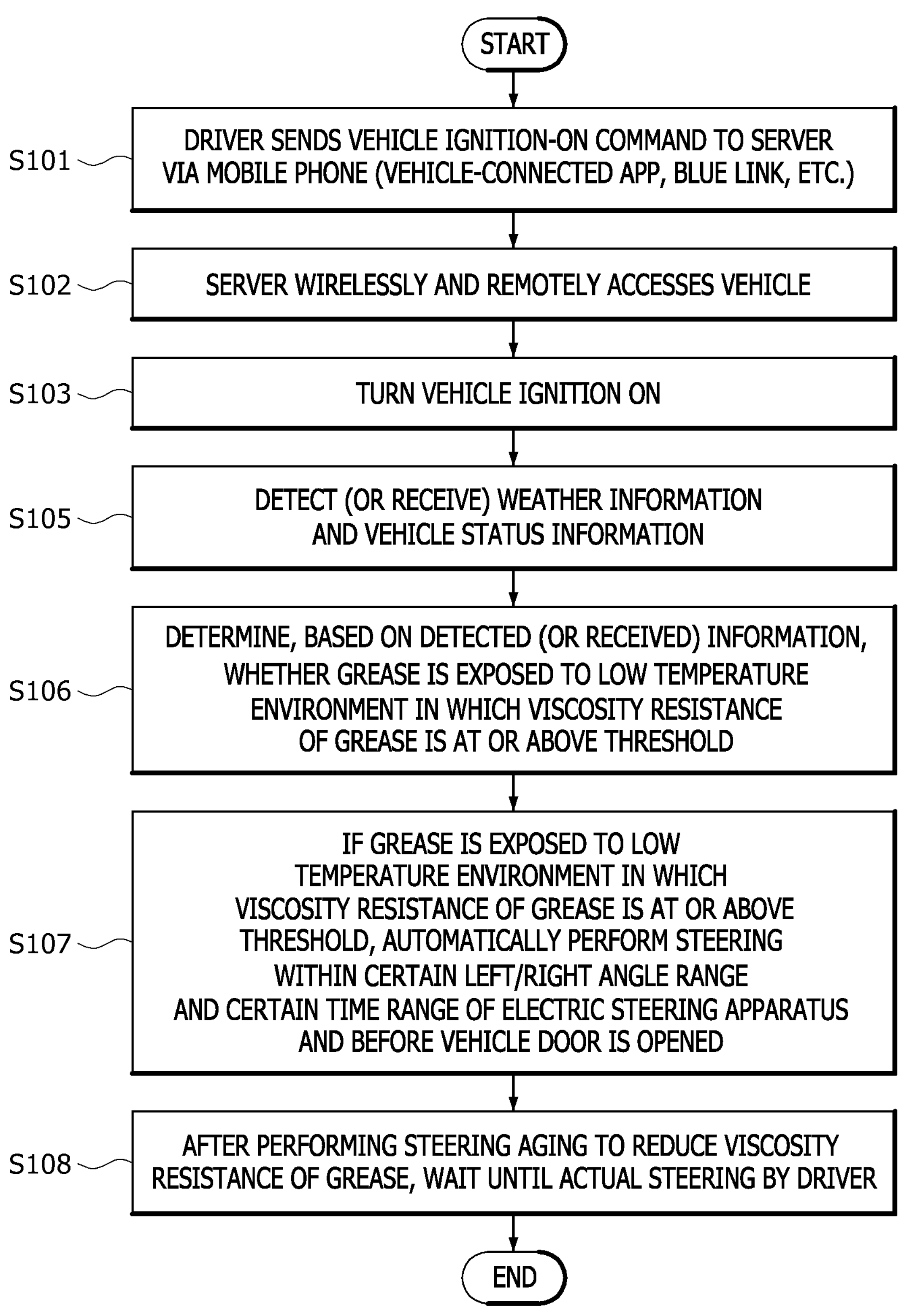
FIG. 2 is a flowchart illustrating a method for controlling an electric steering system when user operation using a mobile phone occurs before a user enters a vehicle according to an embodiment of the present disclosure.

Hereinafter, an apparatus for controlling an electric steering system and a method therefor will be described below with reference to the accompanying drawings through various exemplary embodiments.

It should be considered that the thickness of each line or the size of each component in the drawings may be exaggeratedly illustrated for clarity and convenience of description. In addition, the terms as used herein are defined in consideration of functions of the present disclosure, and these terms may change depending on a user or operator's intention or practice. Therefore, definitions of these terms will have to be made based on the content herein.

Embodiments of the present disclosure are described in detail below with reference to the accompanying drawings so that those skilled in the art may easily implement the embodiments. However, the present disclosure may be implemented in many different forms and is not limited to the embodiments described herein. In order to clearly describe the present disclosure in the drawings, parts not pertinent to the description have been omitted, and similar reference numerals are given to the similar parts herein.

When one element is described to "comprise (or include)" one element herein, this is not intended to preclude any other elements, but rather may further comprise (or include) other elements, unless specifically stated otherwise.

The embodiments described herein may be implemented in, for example, a method or a process, an apparatus, a software program, a data stream, or a signal. Even if only discussed in the context of a single form of embodiment (e.g., discussed only as a method), the embodiment of features discussed may also be implemented in other forms (e.g., an apparatus or program). A device may be implemented with appropriate hardware, software, and firmware, and the like A method may be implemented in a device, such as a processor, which generally refers to a processing device including, for example, a computer, microprocessor, integrated circuit (IC), or programmable logic device.

FIG. 1 is an exemplary view showing a schematic configuration of an apparatus for controlling an electric steering system according to an embodiment of the present disclosure.

As shown in FIG. 1, the apparatus for controlling an electric steering system according to the present embodiment includes a communication transceiver IC 110, an OR gate circuit 120, a power management IC 130, and a processor 140.

The communication transceiver IC 110 remains awake even when a vehicle ignition is turned off. However, when an external operation signal (e.g., a remote wake-up selective message frame) is detected, the communication transceiver IC 110 outputs a CAN transceiver control signal for controlling a power management IC through a signal, a CAN communicator 111, a wake-up detector 112, and a switch 113 inside the communication transceiver IC 110 so as to send a signal to and activates a non-dominant ECU (e.g. MDPS controller, processor, and the like) through a wake-up signal through a wired communication network inside the vehicle.

In the present embodiment, the communication transceiver IC 110 may support a vehicle-connected or vehicle communication wake-up through a mobile phone (e.g., a user's mobile terminal, smartphone, and the like).

The OR gate circuit 120 outputs a signal to activate the power management IC 130 when any one of an ignition signal, a CAN transceiver control signal for controlling the power management IC output from the communication transceiver IC 110, and a self-reset signal (latch signal for controlling PMIC) of the processor 140 is input.

When activated, the power management IC 130 converts battery power into driving power of the processor 140 (e.g., MCU controlling the electric steering system) and applies the resulting driving power to activate (or wake up) the processor 140.

The activated processor 140 controls the electric steering system to automatically perform steering warm-up (or steering aging) before the user (driver) enters the vehicle, when a user (driver) operation using a mobile phone occurs, or when a user (driver) operation using a remote-control key occurs.

For reference, a wake-up function through vehicle communication is a function that enables an ECU (e.g., the communication transceiver IC 110) performing a dominant role in the vehicle communication network to wake up, by an external operation signal, other ECUs (e.g., a MDPS controller, the processor 140, and the like) performing a non-dominant role in the network and to prepare such other ECUs for operation, while the vehicle communication network no longer performs communication after the vehicle ignition is turned off.

To this end, the ECUs (e.g., the communication transceiver IC 110, the MDPS controller, the processor 140, and the like) performing the dominant/non-dominant roles are connected through the wired communication network in a vehicle's internal system. Accordingly, even when the vehicle ignition is turned off, the ECU (e.g., the communication transceiver IC 110) performing a dominant role remains awake, and the remaining non-dominant ECUs (e.g., the MDPS controller, the processor 140, and the like) remain in a state of minimal current consumption (e.g., a sleep state) to prevent battery drain.

When the ECU (e.g., the communication transceiver IC 110) performing a dominant role detects an external operation signal, the ECU (e.g., the communication transceiver IC 110) performing a dominant role sends a signal to the non-dominant ECUs (e.g., the MDPS controller, the processor 140, and the like) through a wake-up signal through the wired communication network and activates the non-dominant ECUs.

Accordingly, the vehicle requires the communication transceiver IC 110 supporting an external wake-up function. For an electrified (electric) vehicle, the external wake-up function may be supported through a selective wake-up function, which may activate only specific controllers necessary to reduce battery current consumption.

When a vehicle's dominant ECU generates a wake-up signal through a communication channel, a conventional wake-up method activates all non-dominant ECUs connected to the communication network, and thus activates even an ECU that does not need activation at that time, thereby draining energy from a vehicle battery. On the other hand, a selective wake-up method is an advanced method, which may selectively activate only an ECU that needs activation at that time in order to overcome the limitation of the conventional wake-up method (especially in terms of energy saving for the electrified vehicle using a battery as a main energy source).

Thus, unlike the conventional method of generating a common wake-up signal (a high electrical signal for a certain period of time) through a communication network, the selective wake-up method assigns a unique communication address to each ECU and generates a communication message frame having the address only for an ECU that a user wants to activate, thereby activating only the relevant ECU through a selective wake-up.

Thus, in order to use the selective wake-up method, the communication transceiver IC 110 supporting the selective wake-up needs to be employed for an ECU. The communication transceiver IC 110 supporting the selective wake-up method typically may also support a conventional wake-up.

The following is a more detailed description of how the activated (woken up) processor 140 controls the electric steering system to automatically perform steering warm-up (or steering aging) before the user (driver) enters the vehicle, when a user (driver) operation using a mobile phone occurs, or when a user (driver) operation using a remote-control key occurs.

The present embodiment may apply to a vehicle supporting a vehicle-connected or vehicle communication wake-up through a mobile phone.

FIG. 2 is a flowchart illustrating a method for controlling an electric steering system when user (driver) operation using a mobile phone occurs before a user enters a vehicle according to an embodiment of the present disclosure.

Referring to FIG. 2, when the driver transmits a vehicle ignition-on command to a server (not shown) via a portable terminal (e.g., a mobile phone with a vehicle-connected application installed therein) (not shown) (S101), the server (not shown) wirelessly and remotely accesses the vehicle (not shown) and sends the vehicle ignition-on command (S102).

The vehicle (i.e., the vehicle's processor) processes the vehicle ignition-on command upon receipt of the vehicle ignition-on command (S103).

The vehicle (i.e., the vehicle's processor) activates the electric steering system (e.g., MDPS) (not shown) in response to the vehicle ignition-on (S104).

The vehicle (i.e., the vehicle's processor) detects (or receives) weather information (e.g., temperature information, temperature inside the vehicle, and the like) from a sensor (e.g., a temperature sensor) included inside the vehicle or from a server (not shown), and also detects vehicle information (e.g., information on vehicle ignition-off duration, and the like) (S105).

Based on the detected (or received) information, the vehicle (i.e., the vehicle's processor) determines whether grease is exposed to a low temperature environment in which viscosity resistance of grease is at or above a preset threshold (e.g., a first threshold viscosity resistance) (S106).

For example, a relationship between the detected (or received) information and viscosity resistance of grease may be pre-stored in the form of a lookup table in an internal memory (not shown) through an experiment.

When grease is exposed to a low temperature environment in which viscosity resistance of grease is at or above a preset threshold (e.g., a first threshold viscosity resistance), the processor 140 automatically performs steering (i.e., steering warm-up or steering aging) within a certain left/right angle range and a certain time range of the electric steering system and/or before a vehicle door is opened by the user (driver) (i.e., before the driver enters the vehicle) (S107).

When viscosity resistance of grease becomes equal to or falls below a preset threshold (e.g., a second threshold viscosity resistance) before the door is opened by the user (driver) (i.e., before the driver enters the vehicle), the processor 140 waits until actual steering by the user (driver) (S108).

In this case, the first threshold viscosity resistance and the second threshold viscosity resistance may be set to be the same or may be set to be different.

In addition, whether viscosity resistance of grease becomes equal to or falls below a preset threshold (e.g., a second threshold viscosity resistance) may be determined using the lookup table showing the relationship between the detected (or received) information and viscosity resistance of grease.

Figure 3:
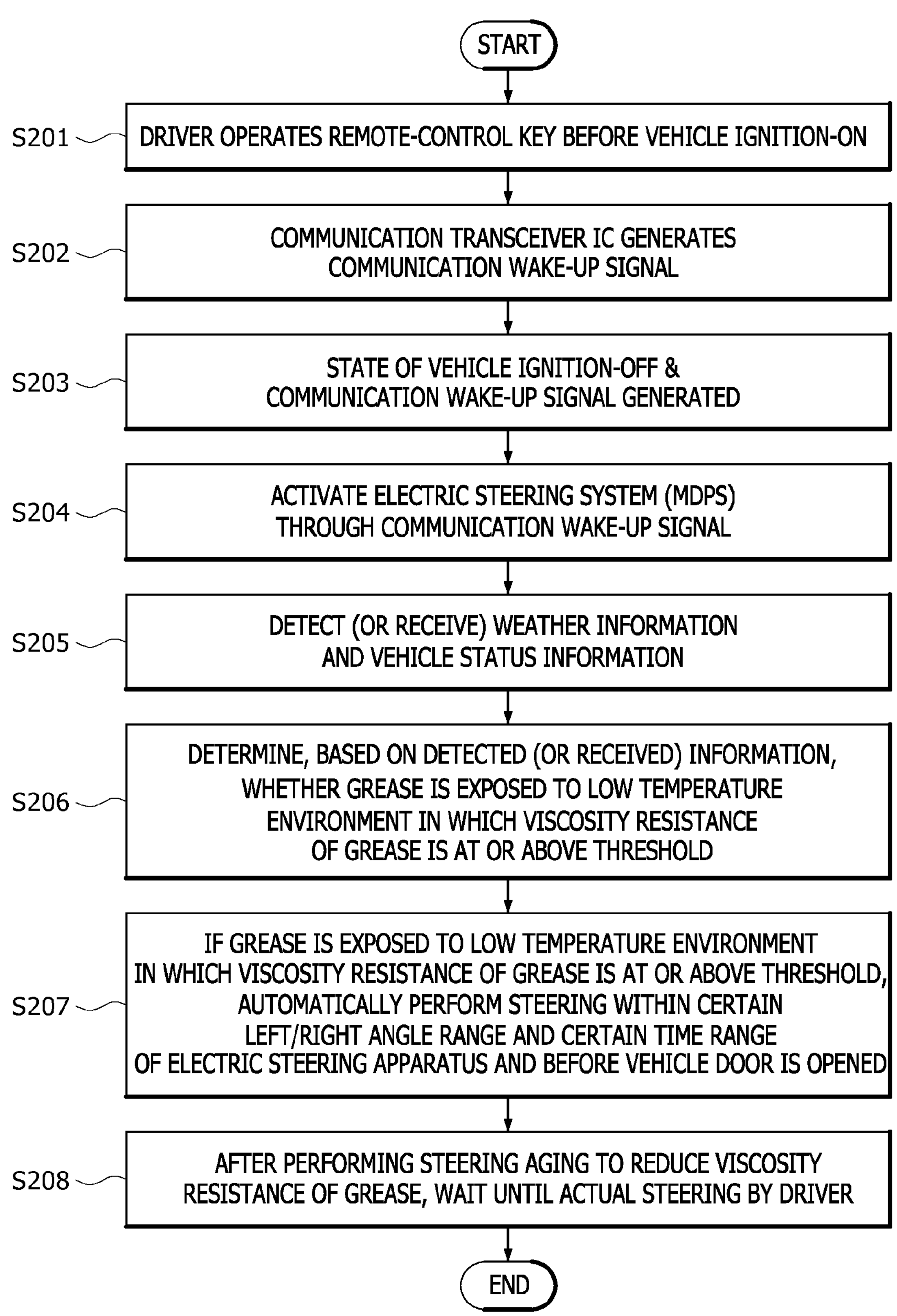
FIG. 3 is a flowchart illustrating the method for controlling an electric steering system when user operation using a remote-control key occurs before a user enters a vehicle according to an embodiment of the present disclosure.

FIG. 3 is a flowchart illustrating the method for controlling an electric steering system when user (driver) operation using a remote-control key occurs before a user (driver) enters a vehicle according to an embodiment of the present disclosure.

Referring to FIG. 3, when the driver operates a remote-control key (e.g., a designated key or any key) before the ignition of the vehicle is on (S201), the communication transceiver IC 110 (e.g., an ECU that plays a dominant role in the vehicle communication network) generates a communication wake-up signal (S202).

When the communication wake-up signal is generated in a state of vehicle ignition-off (S203), the processor 140 of the vehicle activates the electric steering system (e.g., MDPS) (not shown) (S204).

The vehicle (i.e., the vehicle's processor) detects (or receives) weather information (e.g., temperature information, temperature inside the vehicle, and the like) from a sensor (e.g., a temperature sensor) included inside the vehicle or from a server (not shown), and also detects vehicle information (e.g., information on vehicle ignition-off duration, and the like) (S205).

Based on the detected (or received) information, the vehicle (i.e., the vehicle's processor) determines whether grease is exposed to a low temperature environment in which viscosity resistance of grease is at or above a preset threshold (e.g., a first threshold viscosity resistance) (S206).

For example, a relationship between the detected (or received) information and viscosity resistance of grease may be pre-stored in the form of a lookup table in an internal memory (not shown) through an experiment.

When grease is exposed to a low temperature environment in which viscosity resistance of grease is at or above a preset threshold (e.g., a first threshold viscosity resistance), the processor 140 automatically performs steering (i.e., steering warm-up or steering aging) within a certain left/right angle range and a certain time range of the electric steering system and/or before a vehicle door is opened by the user (driver) (i.e., before the driver enters the vehicle) (S207).

When viscosity resistance of grease becomes equal to or falls below a preset threshold (e.g., a second threshold viscosity resistance) before the door is opened by the user (driver) (i.e., before the driver enters the vehicle), the processor 140 waits until actual steering by the user (driver) (S208).

In this case, the first threshold viscosity resistance and the second threshold viscosity resistance may be set to be the same or may be set to be different.

In addition, whether viscosity resistance of grease becomes equal to or falls below a preset threshold (e.g., a second threshold viscosity resistance) may be determined using the lookup table showing the relationship between the detected (or received) information and viscosity resistance of grease.

FIGS. 4*a* and 4*b* are flowcharts illustrating the method for controlling an electric steering system before a user (driver) enters a vehicle according to an embodiment of the present disclosure.

Referring to FIGS. 4*a* and 4*b*, in a state of vehicle ignition-off and a state of communication wake-up signal-OFF (S301), the communication transceiver IC 110 checks whether a driver's operation signal for controlling the vehicle (e.g., a signal by operation of a mobile phone with a vehicle-connected application installed therein and a signal by operation of a remote-control key) is generated (S302).

For example, in the present embodiment, the communication transceiver IC 110 may detect a driver's operation signal for controlling the vehicle (e.g., a signal by operation of a mobile phone with a vehicle-connected application installed therein and a signal by operation of a remote-control key) through the communication transceiver IC 110, but the detection means is not limited thereto. A driver's operation signal may also be detected through other communication means.

When the driver transmits a vehicle ignition-on command to a server (not shown) via a portable terminal (e.g., a mobile phone with a vehicle-connected application installed therein) (not shown) (S101), the server (not shown) wirelessly and remotely accesses the vehicle (not shown) and sends the vehicle ignition-on command (S303).

In this way, the processor 140 of the vehicle is activated (woken up) when the driver's operation signal (i.e., the vehicle ignition-on command) is received via the communication transceiver IC 110 through the driver's portable terminal (not shown) and the server (not shown). The processor 140 then processes the wirelessly and remotely received vehicle ignition-on command (S304). In addition, the processor 140 remotely turns the vehicle ignition on and activates the electric steering system (e.g., MDPS) (not shown) (S305).

In addition, when the driver operates a remote-control key (e.g., a designated key or any key) before the ignition of the vehicle is on, the communication transceiver IC 110 (e.g., an ECU that plays a dominant role in the vehicle communication network) generates a communication wake-up signal (S306).

When the communication wake-up signal is generated in a state of vehicle ignition-off (S203), the processor 140 of the vehicle activates the electric steering system (e.g., MDPS) (not shown) (S308).

The processor 140 detects (or receives) weather information (e.g., temperature information, temperature inside the vehicle, and the like) from a sensor (e.g., a temperature sensor) included inside the vehicle or from a server (not shown), and also detects vehicle information (e.g., information on vehicle ignition-off duration, and the like) (S309).

For example, the processor 140 may receive weather information, such as current temperature information or a cold wave warning, from a server (not shown), detect the actual temperature of the vehicle measured through a temperature sensor mounted inside the vehicle, or detect the temperature of the vehicle through an air conditioner having a built-in temperature sensor. The processor 140 may also communicate with another electronic control unit (ECU) of the vehicle (e.g., an engine control unit, and the like) to detect the duration that the vehicle ignition remains off.

The processor 140 determines whether it is possible to receive weather information (or temperature information) online from a multimedia device (or communication device) (S311). For a vehicle that is capable of receiving weather information (or temperature information) online from a multimedia device (or communication device), if the online temperature information is at or above a designated threshold temperature (e.g., a temperature at which viscosity resistance of grease is at or below a threshold) (a) (S312), the processor 140 waits until actual steering by a user (driver) (S317).

For a vehicle that is incapable of receiving weather information (or temperature information) online from a multimedia device (or communication device), if offline temperature information detected through a sensor mounted inside the vehicle is at or above a designated threshold temperature (e.g., temperature at which viscosity resistance of grease is at or below the threshold) (B) (S313), the processor 140 waits until actual steering by a user (driver) (S317).

In this case, the designated threshold temperature (a) and the designated threshold temperature (B) may be set to be the same or may be set to be different.

If the online temperature information is lower than the designated threshold temperature (a), or if the offline temperature information is lower than the designated threshold temperature (B), the processor 140 determines whether vehicle-off duration (i.e., low temperature duration) is less than a designated threshold time (γ) (S314). If the vehicle-off duration is less than the designated threshold time (γ), the processor 140 waits for actual steering by the user (driver) (S317).

In this case, the threshold temperature (a), the threshold temperature (B), and the threshold time (γ) are determined by experimental values.

However, when the vehicle-off duration (i.e., the low temperature duration) is not less than the designated threshold time (γ), the processor 140 determines that the grease is exposed to a low temperature environment in which viscosity resistance of grease is at or above a preset threshold (e.g., a first threshold viscosity resistance) and then automatically performs steering (i.e., steering warm-up or steering aging) within a certain left/right angle range and a certain time range of the electric steering system and/or before the vehicle door is opened by the user (driver) (i.e., before the driver enters the vehicle) (S315).

Before the door is opened by the user (driver) (i.e., before the driver enters the vehicle), performing of steering (i.e., steering warm-up or steering aging) is completed (S316). Thus, viscosity resistance of grease becomes equal to or falls below a preset threshold (e.g., a second threshold viscosity resistance), and the processor 140 waits until actual steering by the user (driver) (S317).

In this case, the first threshold viscosity resistance and the second threshold viscosity resistance may be set to be the same or may be set to be different.

As described above, the embodiments of the present disclosure may reduce, in advance, viscosity resistance of grease by recognizing a low temperature environment and automatically warming up (or aging) the electric steering system in a stationary state before a user enters the vehicle or before the user enters and starts the vehicle, thereby preventing degradation of the perceived quality caused by a stiff steering feel, noise, and unwanted sound when the driver enters and steers the vehicle.

Although exemplary embodiments of the disclosure have been disclosed for illustrative purposes, those skilled in the art will appreciate that various modifications, additions, and substitutions are possible, without departing from the scope and spirit of the disclosure as defined in the accompanying claims. Thus, the true technical scope of the disclosure should be defined by the following claims.

What is claimed is:

1. An apparatus for controlling an electric steering system, the apparatus comprising:

- a communication transceiver integrated circuit (IC) configured to detect an external operation signal while an ignition of a vehicle is off and output a wake-up signal through an internal communication network of the vehicle; and
- a processor, activated by the wake-up signal, configured to detect weather information or temperature information, temperature inside the vehicle, and information on vehicle ignition-off duration from a sensor or a server included inside the vehicle and to control the electric steering system to automatically perform steering aging before a user enters the vehicle,
- wherein the processor is configured to determine, based on the weather information or the temperature information, the temperature inside the vehicle, and the information on vehicle ignition off duration, that grease is exposed to a low temperature environment in which viscosity resistance of the grease is at or above preset threshold viscosity resistance, and
- the processor is configured to perform the steering aging of the electric steering system based on a lookup table, which shows a relationship, pre-calculated through an experiment, between the detected information and the viscosity resistance of the grease.

2. The apparatus of claim 1, wherein the communication transceiver IC is configured to support a vehicle wake-up in a vehicle connected manner through a mobile terminal of the user.

3. The apparatus of claim 1, wherein:

the communication transceiver IC is configured to output a communication wake-up signal to activate the processor when receiving a signal from a remote-control key of the user before the ignition of the vehicle is on.

4. The apparatus of claim 1, further comprising a power management IC configured to convert battery power into driving power of the processor and apply the driving power to activate the processor by the wake-up signal.

5. The apparatus of claim 1, wherein:

when a user terminal of the user, with a vehicle-connected application installed therein, transmits a vehicle ignition-on command to a server, the communication transceiver IC is configured to receive the vehicle ignition-on command, sent by the server through wireless remote access to the vehicle, to activate the processor, and the processor is configured to process the vehicle ignition-on command to remotely turn the vehicle ignition on and activate the electric steering system to automatically perform the steering aging.

6. The apparatus of claim 1, wherein when the grease is exposed to a low temperature environment in which the viscosity resistance of the grease is at or above the preset threshold viscosity resistance, the processor is configured to automatically perform the steering aging within a preset left/right angle range and a preset time range of the electric steering system before a vehicle door is opened by the user.

7. The apparatus of claim 1, wherein if the temperature information indicates that a temperature outside the vehicle is lower than a designated threshold temperature and if the vehicle ignition-off duration is not less than a designated threshold time, the processor is configured to determine that the grease is exposed to a low temperature environment in which the viscosity resistance of the grease is at or above the preset threshold viscosity resistance, and automatically perform the steering aging in a predetermined manner.

8. A method for controlling an electric steering system, the method comprising:

outputting, by a communication transceiver integrated circuit (IC), a wake-up signal through an internal communication network of the vehicle by detecting an external operation signal while an ignition of a vehicle is off;

detecting, by a processor activated by the wake-up signal, weather information or temperature information, temperature inside the vehicle, and information on vehicle ignition-off duration from a sensor or a server included inside the vehicle; and controlling, by the activated processor, the electric steering system to automatically perform steering aging before a user enters the vehicle, when the processor determines, based on the weather information or the temperature information, the temperature inside the vehicle, and the information on vehicle ignition-off duration, that grease is exposed to a low temperature environment in which viscosity resistance of grease is at or above preset threshold viscosity resistance, wherein the controlling of the electric steering system to automatically perform the steering aging comprises: performing, by the processor, the steering aging of the electric steering system based on a lookup table, which stores a relationship, pre-calculated through an experiment, between the detected information and the viscosity resistance of the grease.

9. The method of claim 8, wherein:

the outputting of the wake-up signal through the internal communication network of the vehicle comprises: outputting, by the communication transceiver IC, a communication wake-up signal to activate the processor when the user operates a remote-control key before the ignition of the vehicle is on.

10. The method of claim 8, further comprising: converting, by a power management IC activated by the wake-up signal, battery power into driving power of the processor and applying, by the power management IC, the driving power to activate the processor by the wake-up signal.

11. The method of claim 8, wherein:

the detecting, by the communication transceiver IC, of the external operation signal comprises: receiving, by the communication transceiver IC, the vehicle ignition-on command sent by a server through wireless remote access to the vehicle, to activate the processor, when a user terminal of the user, with a vehicle-connected application installed therein, transmits a vehicle ignition-on command to the server, and the method further comprises: processing, by the processor, the vehicle ignition-on command to remotely turn the vehicle ignition on, and activating, by the processor, the electric steering system to automatically perform the steering aging.

12. The method of claim 8, further comprises: when the grease is exposed to a low temperature environment in which the viscosity resistance of the grease is at or above a preset threshold viscosity resistance and before a vehicle door is opened by the user, automatically performing, by the processor, the steering aging within a preset left/right angle range and a preset time range of the electric steering system.

13. The method of claim 8, further comprising: if the temperature information indicates that a temperature outside the vehicle is lower than a designated threshold temperature and if the vehicle ignition-off duration is not less than a designated threshold time, determining, by the processor, that the grease is exposed to a low temperature environment in which viscosity resistance of grease is at or above a preset threshold, and automatically performing, by the processor, the steering aging in a pre-determined manner.

* * * * *